US007151126B2

(12) United States Patent
Yang et al.

(10) Patent No.: US 7,151,126 B2
(45) Date of Patent: *Dec. 19, 2006

(54) FLAME RETARDANT THERMOPLASTIC RESIN COMPOSITION

(75) Inventors: Jae Ho Yang, Gyeonggi-do (KR); Sang Hyun Hong, Gyeonggi-do (KR); Gyu Chul Lee, Gyeonggi-do (KR); Bok Nam Jang, Seoul (KR); Sung Hee Ahn, Seoul (KR)

(73) Assignee: Cheil Industries Inc., Kyungsangbuk-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 10/480,180

(22) PCT Filed: Dec. 26, 2001

(86) PCT No.: PCT/KR01/02261

§ 371 (c)(1),
(2), (4) Date: Dec. 8, 2003

(87) PCT Pub. No.: WO02/100946

PCT Pub. Date: Dec. 19, 2002

(65) Prior Publication Data

US 2004/0198877 A1      Oct. 7, 2004

(30) Foreign Application Priority Data

Jun. 8, 2001  (KR) ................... 2001-31956

(51) Int. Cl.
*C08K 5/523*  (2006.01)
*C08K 5/5317*  (2006.01)

(52) U.S. Cl. ............ 524/117; 524/116; 524/122; 524/127; 524/133; 524/140; 524/141

(58) Field of Classification Search ........... 524/116, 524/122, 127, 133, 140–141
See application file for complete search history.

(56) References Cited

U.S. PATENT DOCUMENTS

| 4,062,909 A | 12/1977 | Morgan et al. ......... 260/928 |
| 4,102,853 A * | 7/1978 | Kawamura et al. ...... 524/425 |
| 4,883,835 A | 11/1989 | Buysch et al. ......... 524/504 |
| 4,983,658 A | 1/1991 | Kress et al. ........... 524/141 |
| 5,218,030 A * | 6/1993 | Katayose et al. ....... 524/371 |
| 5,731,390 A | 3/1998 | van Helmond et al. ... 525/438 |
| 5,905,122 A | 5/1999 | Ohtsuka et al. ........ 525/465 |
| 6,576,161 B1 | 6/2003 | Lim et al. ............. 252/609 |
| 6,630,524 B1 | 10/2003 | Lim et al. ............. 524/100 |

FOREIGN PATENT DOCUMENTS

| CA | 1 121 535 | 4/1982 |
| EP | 0149813 | 7/1985 |
| EP | 0 449 689 A1 | 10/1991 |
| EP | 0 612 606 | 8/1994 |
| EP | 0 661 342 A1 | 7/1995 |
| EP | 0 728 811 A2 | 8/1996 |
| EP | 0 795 570 A1 | 9/1997 |
| JP | 7-76649 | 3/1995 |
| JP | 8-208884 | 8/1996 |
| KR | 1994-0014647 | 7/1994 |

OTHER PUBLICATIONS

European Search Report in National Stage European Patent Application No. EP 01 27 4302.
Abstract of European Patent Application No. EP 0149813, Jul. 31, 1985.
Abstract of European Patent Application No. EP 0449689, Oct. 2, 1991.
Patent Abstract of Japan, Publication No. 10-273520, Oct. 13, 1998.
Patent Abstract of Japan, Publication No. 2001-002685, Jan. 9, 2001.
Abstract of Korean Patent Application Laid-open No. 94-14647, Jul. 19, 1994.
Abstract of Japanese Patent Laid-open No. 8-208884, Aug. 13, 1996.
Abstract of Japanese Patent Laid-open No. 7-76649, Mar. 2, 1995.
Abstract of EP0936244, Aug. 18, 1999.

* cited by examiner

*Primary Examiner*—Peter Szekely
(74) *Attorney, Agent, or Firm*—Maria Parrish Tungol

(57) ABSTRACT

The present invention relates to a flame retardant thermoplastic resin composition that contains a polyphenylene ether resin and a phenol resin derivative, both of them having good char formability, regardless of the base resin. A flame retardant thermoplastic resin composition according to the present invention comprises (A) 100 parts by weight of a thermoplastic resin as a base resin, (B) about 0.1~100 parts by weight of polyphenylene ether, (C) about 0.1~100 parts by weight of a phenol resin derivative, and (D) about 0.1~50 parts by weight of a phosphorous compound or a mixture of phosphorous compounds. The thermoplastic resin composition may contain up to 5.0 parts by weight of an anti-dripping agent based on 100 parts by weight of the base resin.

18 Claims, No Drawings

FLAME RETARDANT THERMOPLASTIC RESIN COMPOSITION

FIELD OF THE INVENTION

The present invention relates to a thermoplastic resin composition with good flame retardancy. More particularly, the present invention relates to a flame retardant thermoplastic resin composition that contains a polyphenylene ether resin and a phenol resin derivative, both of them having good char formability, regardless of the base resin.

BACKGROUND OF THE INVENTION

To improve flame retardancy of a thermoplastic resin composition is a major target to the research and development of the resin for a long time. It has been known methods of using an antimony compound, a halogen compound, a phosphorous compound and/or a nitrogen compound to prepare a flame retardant thermoplastic resin composition.

U.S. Pat. Nos. 4,983,658 and 4,883,835 disclose thermoplastic resin compositions using a halogen compound as a flame retardant. The thermoplastic resin composition using a halogen compound shows good flame retardancy regardless of the base resin. However, the disadvantages could be observed that the halogen-containing compound results in the corrosion of the mold itself by the hydrogen halide gases released during the molding process and is fatally harmful due to the toxic gases liberated in case of fire. Therefore, halogen-free flame retardants have become a major concern in this field.

The representative halogen-free flame retardant is a phosphorous flame retardant nowadays. The phosphorous compound is superior to the halogen compound in corrosion of apparatus and toxic gas liberation. However, the phosphorous compound cannot provide better flame retardancy than the halogen compound, and, if more amount of the phosphorous compound is used to improve flame retardancy, the heat resistance is deteriorated. Furthermore, base resins are limited when the phosphorous compound is used as a flame retardant.

Another method to improve flame retardancy of a thermoplastic resin composition is add a material with good char formability to the base resin with poor char formability to form char film during combustion. The char film blocks transporting of oxygen, heat, and other fuel gases which could accelerate combustion of the resin.

As a phenol resin has a good char formability, it has been targeted to conduct a research of the flame retardant thermoplastic resin composition. However, the phenol resin has disadvantages that the intensity of the char film is not so strong, the phenol resin has a poor compatibility with other resin due to polarity of the resin, and a color change problem occurs because of weak weather resistance.

Accordingly, the present inventors have developed a flame retardant thermoplastic resin composition that employs a phenol resin derivative which overcome the shortcomings above of the phenol resin, and that employs a polyphenylene ether resin together to give a synergy effect. The thermoplastic resin composition according to the present invention shows better flame retardancy than the resin compositions using a phenol resin derivative or a polyphenylene ether resin separately.

OBJECTS OF THE INVENTION

A feature of the present invention is the provision of a thermoplastic resin composition with excellent flame retardancy, without a flame retardant except phosphorous compounds, regardless of the base resin.

Another feature of the present invention is the provision of a thermoplastic resin composition that does not result in corrosion of the mold apparatus by the hydrogen halide gases released during the molding process and that does not liberate toxic gases in case of fire.

A further feature of the present invention is the provision of a thermoplastic resin composition with good weather resistance.

Other objects and advantages of this invention will be apparent from the ensuing disclosure and appended claims.

SUMMARY OF THE INVENTION

A flame retardant thermoplastic resin composition according to the present invention comprises (A) 100 parts by weight of a thermoplastic resin as a base resin, (B) about 0.1~100 parts by weight of polyphenylene ether, (C) about 0.1~100 parts by weight of a phenol resin derivative, and (D) about 0.1~50 parts by weight of a phosphorous compound or a mixture of phosphorous compounds. The thermoplastic resin composition may contain up to 5.0 parts by weight of an anti-dripping agent based on 100 parts by weight of the base resin.

DETAILED DESCRIPTION OF THE INVENTION (A) Thermoplastic Resin (Base Resin)

Any thermoplastic resin can be used as a base resin in the present invention. In case of using a phosphorous compound as a flame retardant, the base resin is limited because it is difficult to obtain a sufficient flame retardancy. However, in the present invention, as both a phenol resin derivative and a polyphenylene ether resin are employed, a thermoplastic resin with no or poor char formability can be used as a base resin, resulting in sufficient flame retardancy.

The examples of the thermoplastic resin as base resin include polyacrylonitrile-butadiene-styrene copolymer (ABS resin), rubber modified polystyrene resin (HIPS), acrylonitrile-styrene-acrylate copolymer (ASA resin), methacrylate-butadiene-styrene copolymer (MBS resin), acrylonitrile-ethacrylate-styrene copolymer (AES resin), polycarbonate (PC), polyethylene (PE), polypropylene (PP), polyethylene terephthalate (PET), polybutylene terephthalate (PBT), polyvinyl chloride (PVC), polymethyl methacrylate (PMMA), polyamide (PA), and a copolymer thereof and an alloy thereof.

(B) Polyphenylene Ether (PPE)

The polyphenylene ether in the present invention functions to improve char formability of the thermoplastic resin composition during combustion along with the phenol resin derivative.

As examples of the polyphenylene ether resin, poly(2,6-dimethyl-1,4phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, copolymer of poly(2,6-dimethyl-1,4-phenylene)ether and poly(2,3,6-trimethyl-1,4-phenylene)ether, and copolymer of poly(2,6-dimethyl-1,4-pheylene)ether and poly(2,3,5-triethyl-1,4-phenylene)ether can be used. Preferably, copolymer of poly(2,6-dimethyl-1,4-phenylene)ether and poly(2,3,6-trimethyl-1,4-phenylene)ether, and poly(2,6-dimethyl-1,4-phenylene)ether are preferably used, more preferably poly(2,6-dimethyl-1,4-phenylene)ether is used.

The degree of polymerization of polyphenylene ether is not limited specifically, but considering heat-stability or processability of the resin composition, it is preferable that the viscosity of polypheylene ether is in the range of about 0.1 to 0.8 measured in chloroform solvent at 25° C.

The polyphenylene ether resin is employed in the present invention to give a synergy effect with the phenol resin derivative that will be described below.

The polyphenylene ether may be used in the amount of about 0.01 to 100 parts by weight based on 100 parts by weight of the base resin.

(C) Phenol Resin Derivative

When a phenol resin is used in a thermoplastic resin composition to improve flame retardancy, the phenol resin has disadvantages that the intensity of the char film is not so strong, the phenol resin has a poor compatibility with other resin due to polarity of the resin, and a color change problem occurs because of weak weather resistance. A phenol resin derivative is used to overcome the shortcomings of a phenol resin. The phenol resin derivative is used to provide the base resin with good char formability so as to improve flame retardancy, which has a chemical structure represented by the following Formula (I):

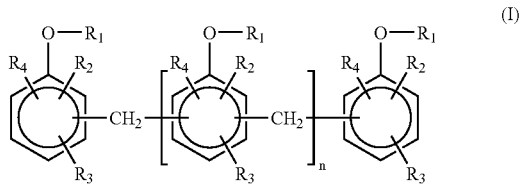

where $R_1$ is alkyl of $C_{1-34}$; aryl; alkyl-substituted aryl; O-, N-, P- or S-containing alkyl; O-, N-, P- or S-containing aryl; or O-, N-, P- or S-containing allyl-substituted aryl; $R_2$, $R_3$, and $R_4$ are hydrogen, alkyl of $C_{1-34}$; aryl; alkyl-substituted aryl; O-, N-, P- or S-containing alkyl; O-, N-, P- or S-containing aryl; or O-, N-, P- or S-containing alkyl-substituted aryl; and n is an integer of 1 to 10,000, preferably 1 to 300 considering mechanical properties and processability.

During combustion, the phenol resin derivative prevents the combusted gases from flowing out by forming char film and oxygen or air from flowing in, functioning as a flame retardant additive. The phenol resin derivative overcomes disadvantages of phenol resin when the phenol resin is used in a thermoplastic resin composition, which are weak intensity of the char film, poor compatibility with other resin due to polarity of the phenol resin, and a color change problem due to weak weather resistance.

The preferable examples of the phenol resin derivative include o-cresol novolak epoxy resin and phenol epoxy resin. The phenol resin derivatives are used in single or in mixture.

The phenol resin derivative may be used in the amount of about 0.01 to 100 parts by weight based on 100 parts by weight of the base resin.

(D) Phosphorous Compound

The phosphorous compound usable in the present invention include a phosphoric acid ester compound, a phosphoamidate compound, an oxaphospholane compound, a carboxy phosphinic acid, phosphoric acid ester morpholide compound and a phosphazene compound. The phosphorous compounds are used in single or in combination. The phosphorous compound maybe used in the amount of about 0.1 to 50 parts by weight based on 100 parts by weight of the base resin. The phosphorous compounds are described in detail as follows:

Phosphoric Acid Ester Compound and Phosphoamidate Compound: The phosphoric acid ester compound and phosphoamidate compound are represented by the following chemical Formula (II):

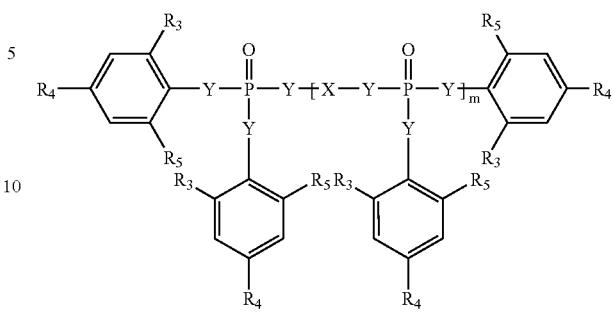

where $R_3$, $R_4$ and $R_5$ are hydrogen or alkyl of $C_{1-4}$, X is aryl of $C_{6-20}$ or aryl of alkyl-substituted $C_{6-20}$ that are derivatives from dialcohol such as resorcinol, hydroquinol, bisphenol-A and bisphenol-S, Y is oxygen or nitrogen, and m is in the range of 0 to 4.

If m is 0 in Formula (II), the compounds may be triphenyl phosphate, tricresyl phosphate, trixylenyl phosphate, tri(2,6-dimethylphenyl)phosphate, tri(2,4,6-trimethylphenyl) phosphate, tri(2,4-ditertiarybutylphenyl)phosphate, tri(2,6-ditertiarybutylphenyl)phosphate and the like, and if m is 1, the compounds may be resorcinolbis(diphenyl)phosphate, resorcinolbis(2,6-dimethylphenyl)phosphate, resorcinolbis (2,4-ditertiary butylphenyl)phosphate, hydroquinol(2,6-dimethylphenyl)phosphate, hydroquinol(2,4-ditertiarybutylphenyl)phosphate and the like. The phosphorous compounds are used in single or in combination.

Oxaphospholane Compound: The oxaphospholane compound is represented by the following chemical Formula (III):

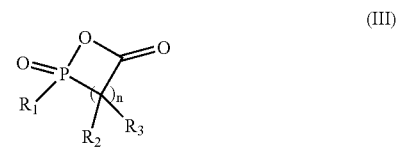

where $R_1$ is hydrogen, alkyl of $C_{1-6}$, or aryl of $C_{6-15}$, $R_2$ and $R_3$ are hydrogen or alkyl of $C_{1-6}$, and n is in the range of 1 to 3.

The preferable examples of the oxaphospholane compound are 2-methyl-2,5-dioxo-1-oxa-2-phospholane and 2-phenyl-2,5-dioxo-1-oxa-2-phospholane. The oxaphospholane compounds are used in single or in combination.

Carboxy Phosphinic Acid Compound: The carboxy phosphinic acid compound is represented by the following chemical Formula (IV):

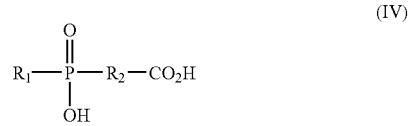

where $R_1$ is hydrogen, alkyl of $C_{1-12}$, aryl of $C_{6-10}$, or alkyl-substituted aryl of $C_{7-15}$, $R_2$ is alkylene of $C_{1-12}$, ring type alkylene of $C_{1-12}$, aryl of $C_{6-12}$, or alkyl-substituted aryl of $C_{6-12}$.

The preferable examples of the carboxy phosphinic acid compound are 2-carboxy-ethyl-methyl-phospanic acid, 2-carboxy-ethyl-phenyl-phospanic acid, and 2-carboxy-methyl-phenyl-phospanic acid. The carboxy phosphinic acid compounds are used in single or in combination.

Phosphoric Acid Ester Morpholide Compound: The phosphoric acid ester morpholide compound is represented by the following chemical Formula (V):

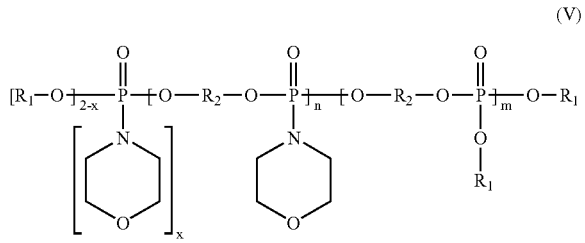

(V)

where $R_1$ is a $C_{6-20}$ aryl group or an alkyl-substituted $C_{6-20}$ aryl group, $R_2$ is a $C_{6-30}$ aryl group or an alkyl-substituted $C_{6-30}$ aryl group, x is 1 or 2, and n and m are number average degree of polymerization and n+m is 0 to 5.

In Formula (V), preferably $R_1$ is a phenyl group or an alkyl-substituted phenyl group where the alkyl is methyl, ethyl, isopropyl, t-butyl, isobutyl, isoamyl or t-amyl, preferably methyl, ethyl, isopropyl or t-butyl, and $R_2$ means preferably a $C_{6-30}$ aryl group or an alkyl-substituted $C_{6-30}$ aryl group which is a derivative from resorcinol, hydroquinone or bisphenol-A.

The phosphoric acid ester morpholide compounds are used in single or in combination.

Phosphazene Compound: The linear phosphazene compound is represented by the following chemical Formula (VI) and the cyclic phosphazene compound is represented by the following chemical Formula (VII):

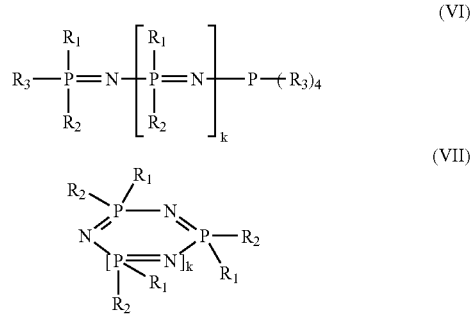

where $R_1$, $R_2$, and $R_3$ are independently alkyl, aryl, alkyl substituted aryl, aralkyl, alkoxy, aryloxy, amino or hydroxyl, and k is an integer from 0 to 10. The alkoxy and aryloxy groups may be substituted with alkyl, aryl, amino, hydroxyl, nitrile, nitro, aryl with hydroxy, and the like.

(E) Anti-dripping Agent

The thermoplastic resin composition according to the present invention may contain up to 5.0 parts by weight of an anti-dripping agent based on 100 parts by weight of the base resin. By using anti-dripping agent, the amounts of the flame retardant and/or char-forming agent can be reduced. The anti-dripping agent is used to prevent the melt resin from dripping during combustion. A fluoride resin is preferably used as an anti-dripping agent.

The fluoride resin form a fibrillar network with the base resin and other resins during extrusion, which will reduce the flow viscosity of the melt resin and increase shrinkage to prevent dripping.

The preferable examples of the fluoride resin include polytetrafluoroethylene, polyvinylidenefluoride, copolymer of polytetrafluoroethylene and polyvinylidenefluoride, copolymer of polytetrafluoroethylene and fluoroalkylvinylether, and copolymer of polytetrafluoroethylene and hexafluoropropylene. Polytetrafluoroethylene may be used more preferably. The fluoride resin compounds are used in single or in combination.

Other additives may be used in the thermoplastic resin composition of the present invention. The additives include an impact modifier, a heat stabilizer, an oxidation inhibitor, a light stabilizer, and an inorganic filler such as talc, silica, mica, glass fiber, an organic or inorganic pigment and/or dye. The additives are employed up to about 50 parts by weight as per 100 parts by weight of the base resin.

The invention may be better understood by reference to the following examples which are intended for the purpose of illustration and are not to be construed as in any way limiting the scope of the present invention, which is defined in the claims appended hereto. In the following examples, all parts and percentage are by weight unless otherwise indicated.

EXAMPLES

The components to prepare flame retardant thermoplastic resin compositions in Examples 1–10 and Comparative Examples 1~are as follows:

(A) Thermoplastic Resin (Base Resin)

($A_1$) High Impact Polystyrene (HIPS)

The high impact polystyrene was prepared through a conventional process, having 9% by weight of rubber content, 1.5 μm of average rubber particle size, and 220,000 of weight average molecular weight.

($A_2$) SAN Graft Copolymer 50 parts of butadiene rubber latex powder, 36 parts of styrene, 14 parts of acrylonitrile and 150 parts of deionized water were mixed. To the mixture, 1.0 parts of potassium oleate, 0.4 parts of cumenhydroperoxide, 0.2 parts of mercaptan-containing chain transfer agent, 0.4 parts of glucose, 0.01 parts of iron sulfate hydroxide and 0.3 parts of pyrophosphate sodium salt were added. The blend was kept at 75° C. for 5 hours to obtain ABS latex. To the ABS latex, 0.4 parts of sulfuric acid was added, coagulated and dried to obtain styrene-containing graft copolymer resin (g-ABS) in powder form.

($A_3$) SAN Copolymer 75 parts of styrene, 25 parts of acrylonitrile, 120 parts of deionized water, 0.15 parts of azobisisobutylonitrile (AIBN) were blended. To the blend, 0.4 parts of tricalciumphosphate and 0.2 parts of mercaptan-containing chain transfer agent were added. The resultant solution was heated to 80° C. for 90 minutes and kept for 180 minutes. The resultant was washed, dehydrated and dried. Styrene-acrylonitrile copolymer (SAN) was obtained.

($A_4$) Polycarbonate Resin

Polycarbonate of linear bisphenol-A type with a weight average molecular weight of 25,000 was used.

(B) Polyphenylene Ether Resin (PPE)

Poly(2,6-dimethyl-1,4-phenylene)ether by Japanese Asahi Co. (Product name: P-402) was used as PPE.

(C) Phenol Resin Derivative ($C_1$) The phenol resin derivative by Kukdo Chemical Co. of Korea (product name: YDCN-500-7P) was used, being represented by the following Formula (VIII):

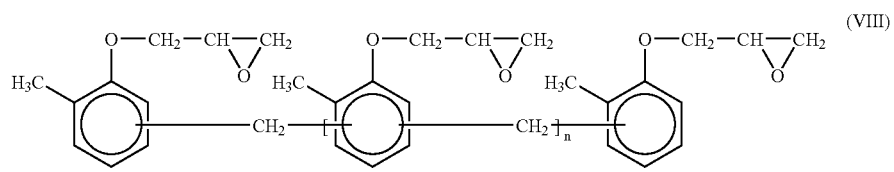

where n has an average value of 2.3.

(C₂) Novolak resin of 50 g with a softening point of 85° C., 200 g of benzyl chloride, and 150 g of isopropanol were dissolved in 20 ml of water, and the resulting solution was heated to 70° C. With agitation, 100 g of 20% NaOH was added to the solution over 1 hour. After reaction for more two hours, the solution was cooled to room temperature. The organic layer was separated from the water layer, and washed with distilled water several times. The separated organic layer was vacuum-distilled to remove benzyl chloride and solvent. The resultant was dried in an oven to obtain the final product that is represented by the following Formula (IX):

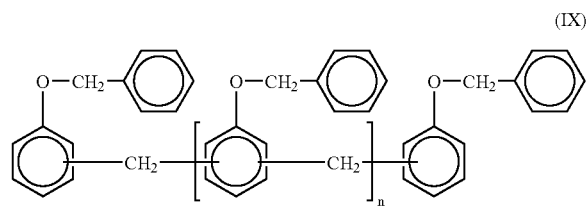

where n has an average value of 3.4.

(C₃) To compare with the phenol resin derivatives, a novolak phenol resin with a molecular weight of about 1000 was used, being represented by the following Formula (X):

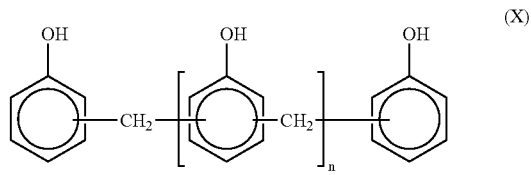

where n has an average value of 5.2.

(D) Phosphorous Compound (D₃) Triphenyl morpholido resorcinol diphosphate represented by the following Formula (XI) was used:

(D₂) Resorcinol diphosphate (RDP) that is a viscous liquid at room temperature was used.

(D₃) Triphenyl morpholido resorcinol diphosphate (TPP) represented by the following Formula (XI) was used:

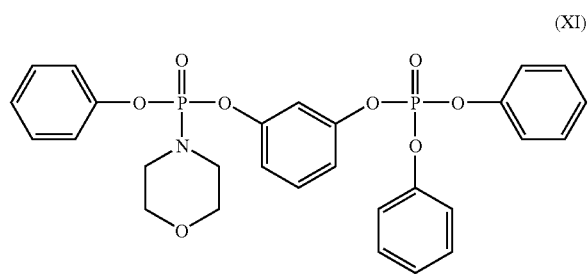

(E) Anti-Dripping Agent

Teflon (registered trademark) 7AJ by Mitsui Dupont company was used.

Examples 1–5 and Comparative Examples 1–3

Use of HIPS as Base Resin

HIPS was used as a base resin in Examples 1–5 and Comparative Examples 1–3. The compositions of the components are shown in Table 1. The resin compositions were extruded at 250~280° C. with a conventional twin screw extruder in pellets.

The resin pellets were dried at 80° C. for 3 hours, and molded into test specimens for measuring flame retardancy and mechanical properties using a 6 oz injection molding machine at 220~280° C. The flame retardancy was measured in accordance with UL94VB. The test specimens have thickness of 3.2 mm and 1.6 mm.

As shown in Table 1, both PPE and a phenol resin derivative were used in Examples 1–5, PPE only was used in Comparative Example 1, a phenol resin derivative was used in Comparative Example 2, and both PPE and a conventional phenol resin were used in Comparative Example 3.

TABLE 1

|  | Examples | | | | | Comp. Examples | | |
| --- | --- | --- | --- | --- | --- | --- | --- | --- |
|  | 1 | 2 | 3 | 4 | 5 | 1 | 2 | 3 |
| (A) | | | | | | | | |
| (A₁) | 100 | 100 | 100 | 100 | 100 | 100 | 100 | 100 |
| (B) | 15 | 15 | 15 | 15 | 15 | 30 | — | 15 |
| (C) | | | | | | | | |
| (C₁) | 15 | — | 5 | 15 | 15 | — | 30 | — |
| (C₂) | — | 15 | — | — | — | — | — | — |
| (C3) | — | — | — | — | — | — | — | 15 |
| (D) | | | | | | | | |
| (D₁) | 12 | 12 | 10 | — | — | 12 | 12 | 12 |
| (D₂) | — | — | — | 12 | — | — | — | — |
| (D₃) | — | — | — | — | 12 | — | — | — |
| (E) | — | — | 0.15 | — | — | — | — | — |
| UL94VB | | | | | | | | |
| 3.2 mm | V1 | V1 | V1 | V1 | V1 | V1 | fail | fail |
| 1.6 mm | V1 | V1 | V1 | V1 | V1 | fail | fail | fail |

As shown in Table 1, the resin compositions of Examples 1–2 have better flame retardancy than those of Comparative Examples 1–2. The resin composition of Comparative Example 3 shows poor flame retardancy, in which a conventional phenol resin was used instead of a phenol resin derivative.

When an anti-dripping agent is used as in Example 3, the amounts of phenol resin derivative and PPE can be reduced without deteriorating flame retardancy of the resin composition.

Examples 6–8 and Comparative Examples 4–6

Use of ABS as Base Resin

ABS resin was used as a base resin in Examples 6–8 and Comparative Examples 4–6. The compositions of the components are shown in Table 2. Examples 6–8 and Comparative Examples 4–6 were conducted in the same manner as in Examples 1–5.

As shown in Table 2, both PPE and a phenol resin derivative were used in Examples 6–8, PPE only was used in Comparative Example 4, a phenol resin derivative was used in Comparative Example 5, and both PPE and a conventional phenol resin were used in Comparative Example 6.

TABLE 2

|  | Examples | | | Comp. Examples | | |
|---|---|---|---|---|---|---|
|  | 6 | 7 | 8 | 4 | 5 | 6 |
| (A) | | | | | | |
| (A$_2$) | 70 | 70 | 70 | 70 | 70 | 70 |
| (A$_3$) | 30 | 30 | 30 | 30 | 30 | 30 |
| (B) | 20 | 20 | 15 | 30 | — | 20 |
| (C) | | | | | | |
| (C$_1$) | 10 | — | 10 | — | 30 | — |
| (C$_2$) | — | 10 | — | — | — | — |
| (C$_3$) | — | — | — | — | — | 10 |
| (D) | | | | | | |
| (D$_1$) | 12 | 12 | 12 | 12 | 12 | 12 |
| (E) | — | — | 0.15 | — | — | — |
| UL94VB | | | | | | |
| (3.2 mm) | V1 | V1 | V1 | V1 | fail | V1 |
| (1.6 mm) | V1 | V1 | V1 | fail | fail | fail |

As shown in Table 2, the resin compositions of Examples 6–8 have better flame retardancy than those of Comparative Examples 4–6. The resin composition of Comparative Example 6 shows poor flame retardancy, in which a conventional phenol resin was used instead of a phenol resin derivative.

When an anti-dripping agent is used as in Example 8, the amounts of phenol resin derivative and PPE can be reduced without deteriorating flame retardancy of the resin composition.

Examples 9–10 and Comparative Examples 7–8

Use of PC(polycarbonate)/ABS Alloy as Base Resin

PC/ABS resin was used as a base resin in Examples 9–10 and Comparative Examples 7–8. The compositions of the components are shown in Table 3. Examples 9–10 and Comparative Examples 7–8 were conducted in the same manner as in Examples 1–5.

As shown in Table 3, both PPE and a phenol resin derivative were used in Examples 9–10, PPE only was used in Comparative Example 7, and both PPE and a conventional phenol resin were used in Comparative Example 8.

TABLE 3

|  | Examples | | Comp. Examples | |
|---|---|---|---|---|
|  | 9 | 10 | 7 | 8 |
| (A) | | | | |
| (A$_2$) | 42 | 42 | 42 | 42 |
| (A$_3$) | 18 | 18 | 18 | 18 |
| (A$_4$) | 40 | 40 | 40 | 40 |
| (B) | 10 | 10 | 25 | 10 |

TABLE 3-continued

|  | Examples | | Comp. Examples | |
|---|---|---|---|---|
|  | 9 | 10 | 7 | 8 |
| (C) | | | | |
| (C$_1$) | 15 | — | — | — |
| (C$_2$) | — | 15 | — | — |
| (C$_3$) | — | — | — | 15 |
| (D) | | | | |
| (D1) | 12 | 12 | 12 | 12 |
| UL94VB | | | | |
| (3.2 mm) | V1 | V1 | fail | fail |
| (1.6 mm) | V1 | V1 | fail | fail |

PC/ABS resin with over 70% by weight of PC can easily obtain good flame retardancy. However, PC/ABS resin with a lower content of PC like in Table 3 (40% PC content) cannot obtain good flame retardancy. Examples 9 and 10 show that PC/ABS resins with a lower content of PC, 40% content, can obtain UL 94 V1 flame retardancy if both PPE and a phenol resin derivative are used.

The present invention can be easily carried out by an ordinary skilled person in the art. Many modifications and changes may be deemed to be with the scope of the present invention as defined in the following claims.

The invention claimed is:

1. A flame retardant thermoplastic resin composition comprising:
   (A) 100 parts by weight of a base resin selected from the group consisting of polyacrylonitrile-butadiene-styrene copolymer (ABS resin), rubber modified polystyrene resin (HIPS), acrylonitrile-styrene-acrylate copolymer (ASA resin), methacrylate-butadiene-styrene copolymer (MBS resin), acrylonitrile-ethacrylate-styrene copolymer (ABS resin), polycarbonate (PC), polyethylene (PE), polypropylene (PP), polyvinyl chloride (PVC), polymethyl methacrylate (PMMA), polyamide (PA), and a copolymer thereof and an alloy thereof;
   (B) about 0.1~100 parts by weight of polyphenylene ether;
   (C) about 0.1~100 parts by weight of a phenol resin derivative represented by the following Formula;

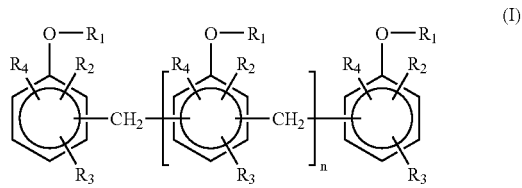

(I)

where R$_1$ is alkyl of C$_{1-34}$; aryl; alkyl-substituted aryl; O-, N-, P- or S-containing alkyl; O-, N-, P- or S-containing aryl; or O-, N-, P- or S-containing alkyl-substituted aryl; R$_2$, R$_3$, and R$_4$ are hydrogen, alkyl of C$_{1-34}$; aryl; alkyl-substituted aryl; O-, N-, P- or S-containing alkyl; O-, N-, P- or S-containing aryl; or O-, N-, P- or S-containing alkyl-substituted aryl; and n is an integer of 1 to 10,000; and D) about 0.1~50 parts by weight of a phosphorous compound.

2. The flame retardant thermoplastic resin composition as defined in claim 1, further comprising up to about 5.0 parts by weight of an anti-dripping agent based on 100 parts by weight of the base resin.

3. The flame retardant thermoplastic resin composition as defined in claim 2, wherein said anti-dripping agent is a fluoride resin.

4. The flame retardant thermoplastic resin composition as defined in claim 1, wherein said phenol resin derivative is selected from the group consisting of o-cresol novolak epoxy resin, phenol epoxy resin and a mixture thereof.

5. The flame retardant thermoplastic resin composition as defined in claim 1, wherein said phosphorous compound is selected from the group consisting of a phosphoric acid ester compound, a phosphoamidate compound, an oxaphospholane compound, a carboxy phosphinic acid, a phosphazene compound and a mixture thereof.

6. A flame retardant thermoplastic resin composition comprising:
(A) 100 parts by weight of a thermoplastic resin as a base resin;
(B) about 0.1~100 parts by weight of polyphenylene ether;
(C) about 0.1~100 parts by weight of a phenol resin derivative represented by the following Formula:

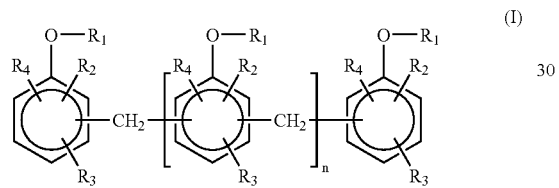

where $R_1$ is alkyl of $C_{1-34}$; aryl; alkyl-substituted aryl; O-, N-, P- or S-containing alkyl: O-, N-, P- or S-containing aryl; or O-, N-, P- or S-containing alkyl-substituted aryl; $R_2$, $R_3$, and $R_4$ are hydrogen, alkyl of $C_{1-34}$; aryl; alkyl-substituted aryl; O-, N-, P- or S-containing alkyl; O-, N-, P- or S-containing aryl; or O-, N-, P- or S-containing alkyl-substituted aryl; and n is an integer of 1 to 10,000; and D) about 0.1~50 parts by weight of a phosphorous compound wherein said oxaphospholane compound is represented by the following Formula:

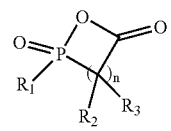

where $R_1$ is hydrogen, alkyl of $C_{1-6}$, aryl of $C_{6-15}$, $R_2$ and $R_3$ are hydrogen or alkyl of $C_{1-6}$, and n is in the range of 1 to 3.

7. A flame retardant thermoplastic resin composition comprising:
(A) 100 pans by weight of a thermoplastic resin as a base resin;
(B) about 0.1~100 parts by weight of polyphenylene ether;
(C) about 0.1~100 parts by weight of a phenol resin derivative represented by the following Formula:

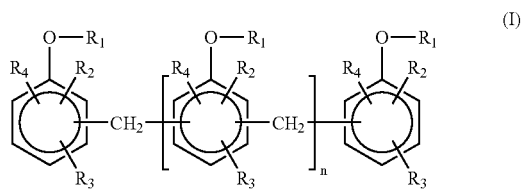

where $R_1$ is alkyl of $C_{1-34}$; aryl; alkyl-substituted aryl; O-, N-, P- or S-containing alkyl; O-, N-, P- or S-containing aryl; or O-, N-, P- or S-containing alkyl-substituted aryl; $R_2$, $R_3$, and $R_4$ are hydrogen, alkyl of $C_{1-34}$; aryl; alkyl-substituted aryl; O-, N-, P- or S-containing alkyl; O-, N-, P- or S-containing aryl; or O-, N-, P- or S-containing alkyl-substituted aryl; and n is an integer of 1 to 10,000; and D) about 0.1~50 parts by weight of a phosphorous compound wherein said carboxy phosphinic acid compound is represented by the following Formula:

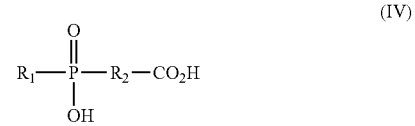

where $R_1$ is hydrogen, alkyl of $C_{1-12}$, aryl of $C_{6-10}$, or alkyl-substituted aryl of $C_{7-15}$, $R_2$ is alkylene of $C_{1-12}$, ring type alkylene of $C_{1-12}$, aryl of $C_{6-12}$, or alkyl-substituted aryl of $C_{6-12}$.

8. The flame retardant thermoplastic resin composition as defined in claim 2, further comprising an impact modifier, a heat stabilizer, an oxidation inhibitor, a light stabilizer, an inorganic filler, or an organic or inorganic pigment and/or dye up to about 50 parts by weight as per 100 parts by weight of the base resin.

9. A molded article prepared by the flame retardant thermoplastic resin composition of claim 1.

10. A molded article prepared by the flame retardant thermoplastic resin composition of claim 5.

11. The flame retardant thermoplastic resin composition as defined in claim 8, wherein the inorganic filler is talc, silica, mica, or glass fiber.

12. The flame retardant thermoplastic resin composition as defined in claim 1, wherein said phosphorous compound is represented by the following Formula:

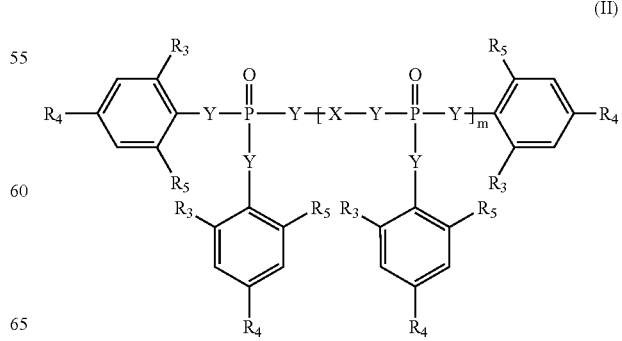

where $R_3$, $R_4$ and $R_5$ are hydrogen or alkyl of $C_{1-4}$, X is aryl of $C_{6-20}$ or aryl of alkyl-substituted $C_{6-20}$ that are derivatives from dialcohol such as resorcinol, hydroquinol, bisphenol-A and bisphenol-S, Y is oxygen or nitrogen, and m is in the range of 0 to 4.

13. The flame retardant thermoplastic resin composition as defined in claim 1, wherein said phosphorous compound is represented by the following Formula:

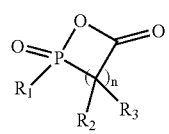
(III)

where $R_1$ is hydrogen, alkyl of $C_{1-6}$, or aryl of $C_{6-15}$, $R_2$ and $R_3$ are hydrogen or alkyl of $C_{1-6}$, and n is in the range of 1 to 3.

14. The flame retardant thermoplastic resin composition as defined in claim 1, wherein said phosphorous compound is represented by the following Formula:

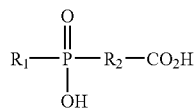
(IV)

where $R_1$ is hydrogen, alkyl of $C_{1-12}$, aryl of $C_{6-10}$, or alkyl-substituted aryl of $C_{7-15}$, $R_2$ is alkylene of $C_{1-12}$, ring type alkylene of $C_{1-12}$, aryl of $C_{6-12}$, or alkyl-substituted aryl of $C_{6-12}$.

15. The flame retardant thermoplastic resin composition as defined in claim 1, wherein said phosphorous compound is represented by the following Formula (VI):

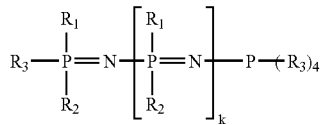
(VI)

-continued

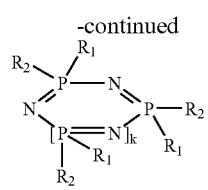

where $R_1$, $R_2$, and $R_3$ are independently alkyl, aryl, alkyl substituted aryl, aralkyl, alkoxy, aryloxy, substituted alkoxy, substituted aryloxy, amino or hydroxyl, and k is an integer from 0 to 10 wherein the substituted alkoxy is substituted with alkyl, aryl, amino, hydroxyl, nitrile, or nitro and the substituted aryl is substituted with hydroxy.

16. The flame retardant thermoplastic resin composition as defined in claim 1, wherein said phosphorous compound is represented by the following Formulae (VII):

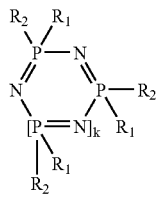
(VII)

where $R_1$, $R_2$, and $R_3$ are independently alkyl, aryl, alkyl substituted aryl, aralkyl, alkoxy, aryloxy, substituted alkoxy, substituted aryloxy, amino or hydroxyl, and k is an integer from 0 to 10 wherein the substituted alkoxy is substituted with alkyl, aryl, amino, hydroxyl, nitrile, or nitro and the substituted aryl is substituted with hydroxy.

17. A molded article prepared by the flame retardant thermoplastic resin composition of claim 6.

18. A molded article prepared by the flame retardant thermoplastic resin composition of claim 7.

* * * * *